US008424298B2

(12) United States Patent
Ariga et al.

(10) Patent No.: US 8,424,298 B2
(45) Date of Patent: Apr. 23, 2013

(54) PUMP TORQUE CONTROL SYSTEM FOR HYDRAULIC CONSTRUCTION MACHINE

(75) Inventors: Nobuei Ariga, Tsuchiura (JP); Kouji Ishikawa, Kasumigaura (JP); Hideo Karasawa, Tsuchiura (JP); Yasuo Okano, Tsuchiura (JP); Kazunori Nakamura, Tsuchiura (JP); Youichi Kowatari, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1043 days.

(21) Appl. No.: 12/445,605

(22) PCT Filed: Jan. 30, 2008

(86) PCT No.: PCT/JP2008/051452

§ 371 (c)(1),
(2), (4) Date: Apr. 15, 2009

(87) PCT Pub. No.: WO2008/096652

PCT Pub. Date: Aug. 14, 2008

(65) Prior Publication Data

US 2010/0186402 A1 Jul. 29, 2010

(30) Foreign Application Priority Data

Feb. 9, 2007 (JP) .................................. 2007-31182

(51) Int. Cl.
*F16D 31/02* (2006.01)

(52) U.S. Cl.
USPC .................... 60/329; 60/431; 60/447; 60/452

(58) Field of Classification Search .................... 60/329, 60/431, 433, 434, 443, 444, 447, 449, 452
See application file for complete search history.

(56) References Cited

U.S. PATENT DOCUMENTS

| | | | | |
|---|---|---|---|---|
| 6,183,210 | B1 * | 2/2001 | Nakamura | 60/431 |
| 6,655,135 | B2 | 12/2003 | Oka | |
| 7,020,553 | B2 | 3/2006 | Nakamura et al. | |
| 2005/0071064 | A1 | 3/2005 | Nakamura et al. | |

FOREIGN PATENT DOCUMENTS

| | | | |
|---|---|---|---|
| EP | 1 267 075 | A2 | 12/2002 |
| JP | 62-8618 | B2 | 2/1987 |
| JP | 11-101183 | A | 4/1999 |
| JP | 2002-364603 | A | 12/2002 |
| WO | 2004/018877 | A1 | 3/2004 |

* cited by examiner

*Primary Examiner* — Michael Leslie
(74) *Attorney, Agent, or Firm* — Mattingly & Malur, P.C.

(57) ABSTRACT

A pump torque control system is capable of preventing hunting due to interference between speed sensing control and control of an engine speed of a prime mover when the temperature of a hydraulic fluid is low.

A maximum absorption torque is set in a regulator 31 that controls displacement volumes of hydraulic pumps 2 and 3 based on a deviation between target and actual engine speeds of a prime mover 1. A second modification factor calculating section 45 and a control gain modifying section 49, which are included in a controller 23 that performs speed sensing control to ensure that the maximum absorption torque of the hydraulic pumps 2 and 3 is reduced, change a control gain of the speed sensing control based on a value detected by the hydraulic temperature sensor 34 to ensure that the control gain is reduced as the temperature of the hydraulic fluid is reduced.

4 Claims, 9 Drawing Sheets

PUMP TORQUE CONTROL SYSTEM FOR HYDRAULIC CONSTRUCTION MACHINE

TECHNICAL FIELD

The present invention relates to a pump torque control system for a hydraulic construction machine, and more particularly to a pump torque control system, which drives hydraulic actuators by means of a hydraulic fluid delivered from hydraulic pumps rotationally driven by a prime mover and is used for a hydraulic construction machine such as a hydraulic excavator to be used for necessary work.

BACKGROUND ART

A typical hydraulic construction machine such as a hydraulic excavator includes a pump torque control system having a regulator, which controls a displacement volume of a hydraulic pump and has a pump torque control function. The displacement volume of the hydraulic pump is controlled by the pump torque control system to ensure that an absorption torque of the hydraulic pump does not exceed a preset maximum absorption torque. This suppresses overload applied to a prime mover and prevents an engine stall.

In connection with such a pump torque control system for a hydraulic construction machine, Patent Document 1 discloses a control method titled "Method for controlling drive system including internal combustion and hydraulic pump". The control method is to obtain the difference (engine speed deviation) between a target engine speed and an actual engine speed detected by an engine speed sensor and control an input torque of a hydraulic pump based on the engine speed deviation. The control method is an example of speed sensing control. This speed sensing control is capable of temporarily reducing the maximum absorption torque during the pump torque control, reliably preventing an engine stall due to overload applied to a prime mover, and quickly increasing an engine speed by controlling the amount of fuel to be injected.

In addition, in connection with such a pump torque control system, Patent Document 2 discloses a technique for controlling the maximum absorption torque of a hydraulic pump based on sensed environment related to a prime mover and the periphery of the prime mover, and suppressing a reduction in the engine speed of a prime mover even when power output from the prime mover is reduced due to a change in environment.

Patent Document 1: JP-B-62-8618
Patent Document 2: JP-A-11-101183

DISCLOSURE OF THE INVENTION

Problem to be Solved by the Invention

The abovementioned conventional techniques, however, encounter the following problems.

A typical hydraulic construction machine such as a hydraulic excavator is operated in outdoors. After the operation for the day is finished, the hydraulic construction machine is left in a workplace until the next operation starts. If the hydraulic construction machine is left in a workplace for a long time under such an environment as a cold region, in which the ambient temperature is low, the temperature of the entire hydraulic construction machine is reduced to the ambient temperature level. As a result, the temperature of a hydraulic fluid used by a hydraulic drive system of the hydraulic construction machine is also reduced. Since an operation of the hydraulic construction machine restarts under such conditions, the temperature of the hydraulic fluid is low until a warm-up operation for starting the operation of the hydraulic construction machine is sufficiently performed. The viscosity of the hydraulic fluid is high. The flow of the hydraulic fluid is therefore deteriorated.

When a hydraulic construction machine having a pump torque control system performing such speed sensing control as the technique described in Patent Document 1 is operated under the condition that the temperature of the hydraulic fluid is low and the viscosity of the hydraulic fluid is high, a response may be delayed in the speed sensing control due to the delay of output of control pressure, the delay of a pump tilting operation, or the like. When a fluctuating frequency of a pump torque due to the speed sensing control matches a fluctuating frequency of the engine speed due to control on the amount of fuel to be injected to a prime mover, the speed sensing control and the control of the engine speed due to control on the amount of the fuel to be injected to the prime mover interfere with each other. This may result in hunting.

In the technique described in Patent Document 2, even when power output from the prime mover is reduced due to a change in environment related to the prime mover and the periphery of the prime mover, the environment factors (atmospheric pressure, the temperature of the fuel, the temperature of cooling water, an intake temperature, intake pressure, an exhaust temperature, exhaust pressure, the temperature of engine oil) related to reduction in power output from the engine are detected and a reduction in the torque under the speed sensing control is modified in order to suppress a reduction in the engine speed of the prime mover. In the technique described in Patent Document 2, however, the temperature of a hydraulic fluid, which is not directly involved in the reduction in the power output from the prime mover, is not detected. Therefore, when the temperature of the hydraulic fluid is low and the viscosity of the hydraulic fluid is high, the technique described in Patent Document 2 encounters a similar problem to that of Patent Document 1.

An object of the present invention is to provide a pump torque control system for a hydraulic work machine. The pump torque control system is capable of preventing from hunting caused by interference between speed sensing control and control on an engine speed of a prime mover under the condition that the temperature of hydraulic fluid is low, and performing appropriate pump torque control.

Means for Solving the Problem (1) To accomplish the abovementioned object, a pump torque control system for a hydraulic construction machine, according to the present invention, includes: a prime mover; variable displacement hydraulic pumps that are rotationally driven by the prime mover; hydraulic actuators that are driven by means of a hydraulic fluid delivered from the hydraulic pumps; pump absorption torque control means for controlling displacement volumes of the hydraulic pumps to ensure that the total absorption torque of the hydraulic pumps does not exceed a set maximum absorption torque; and speed sensing control means for calculating a first torque reduction amount based on a deviation between a target engine speed of the prime mover and an actual engine speed of the prime mover and performing control to reduce the maximum absorption torque of the hydraulic pumps based on the first torque reduction amount, the maximum absorption torque of the hydraulic pump being set in the pump absorption torque control means based on the first torque reduction amount, wherein the speed sensing control means includes hydraulic fluid temperature detection means for detecting the temperature of the hydraulic fluid, and first hydraulic fluid temperature modification means for modifying a control gain to be used to calculate the first torque reduction amount in order to ensure that the first torque reduction amount is reduced as the temperature of the hydraulic fluid detected by the hydraulic fluid temperature detection means is reduced.

As described above, the speed sensing control means includes the hydraulic fluid temperature detection means and the first hydraulic fluid temperature modification means. The first hydraulic fluid temperature modification means modifies the control gain to be used to calculate the first torque reduction amount in order to ensure that the first torque reduction amount is reduced as the temperature of the hydraulic fluid is reduced. Due to the modification, the amount of a controlled pump torque under the speed sensing control is reduced when the construction machine is operated under the condition that the temperature of the hydraulic fluid is low and the viscosity of the hydraulic fluid is high. A response delay in the speed sensing control due to the delay of output of control pressure, the delay of the pump tilting operation or the like is suppressed. It is therefore possible to prevent a resonance between a fluctuating frequency of the pump torque due to the speed sensing control and a fluctuating frequency of the engine speed of the prime mover due to the control on the amount of the fuel to be injected. This prevents from hunting due to interference between the speed sensing control and the control of the engine speed of the prime mover and thereby makes it possible to perform appropriate pump torque control.

(2) In the item (1), it is preferable that the speed sensing control means further have second hydraulic fluid temperature modification means for limiting a target value of the maximum absorption torque to ensure that the maximum absorption torque set in the pump absorption torque control means is reduced as the temperature of the hydraulic fluid detected by the hydraulic fluid temperature detection means is reduced.

Similarly to the item (1), this configuration makes it possible to prevent a stall of the prime mover and an increase in the number of temporal reductions in the engine speed due to a load rapidly applied to the prime mover, which is caused by insufficient effectiveness of the speed sensing control, since the maximum absorption torque of the hydraulic pumps is set to a relatively low level based on the temperature of the hydraulic fluid even under the condition that the amount of a controlled pump torque under the speed sensing control is reduced to reduce effectiveness of the speed sensing control when the temperature of the hydraulic fluid is low.

(3) In the item (1), it is preferable that the first hydraulic fluid temperature modification means include first means for calculating a hydraulic fluid temperature modification value that is reduced as the temperature of the hydraulic fluid is reduced, and second means for modifying the first torque reduction amount by using the hydraulic fluid temperature modification value and changing the control gain. It is preferable that the speed sensing control means further include third means for reducing the first torque reduction amount modified by the second means from a base torque of the hydraulic pumps and calculating a target value of the maximum absorption torque, and fourth means for setting the maximum absorption torque of the hydraulic pumps in the pump absorption torque control means based on the target value of the maximum absorption torque.

(4) In the item (3), it is preferable that the speed sensing control means further include fifth means for calculating a second torque reduction amount that is reduced as the temperature of the hydraulic fluid detected by the hydraulic fluid temperature detection means is reduced. It is preferable that the third means reduces the first and second torque reduction amounts from the base torque of the hydraulic pumps to calculate a target value of the maximum absorption torque.

Effects of the Invention

According to the present invention, the pump torque control system is capable of preventing from hunting due to interference between the speed sensing control and the control on the engine speed of the prime mover and performing appropriate pump torque control, even when the temperature of the hydraulic fluid is low and the viscosity of the hydraulic fluid is high.

In addition, according to the present invention, the pump torque control system is capable of preventing a stall of the prime mover and an increase in the number of temporal reductions in the engine speed due to a load rapidly applied to the prime mover even under the condition that the amount of a controlled pump torque under the speed sensing control is reduced to reduce effectiveness of the speed sensing control when the temperature of the hydraulic fluid is low.

DESCRIPTION OF REFERENCE NUMERALS

Figure 1:
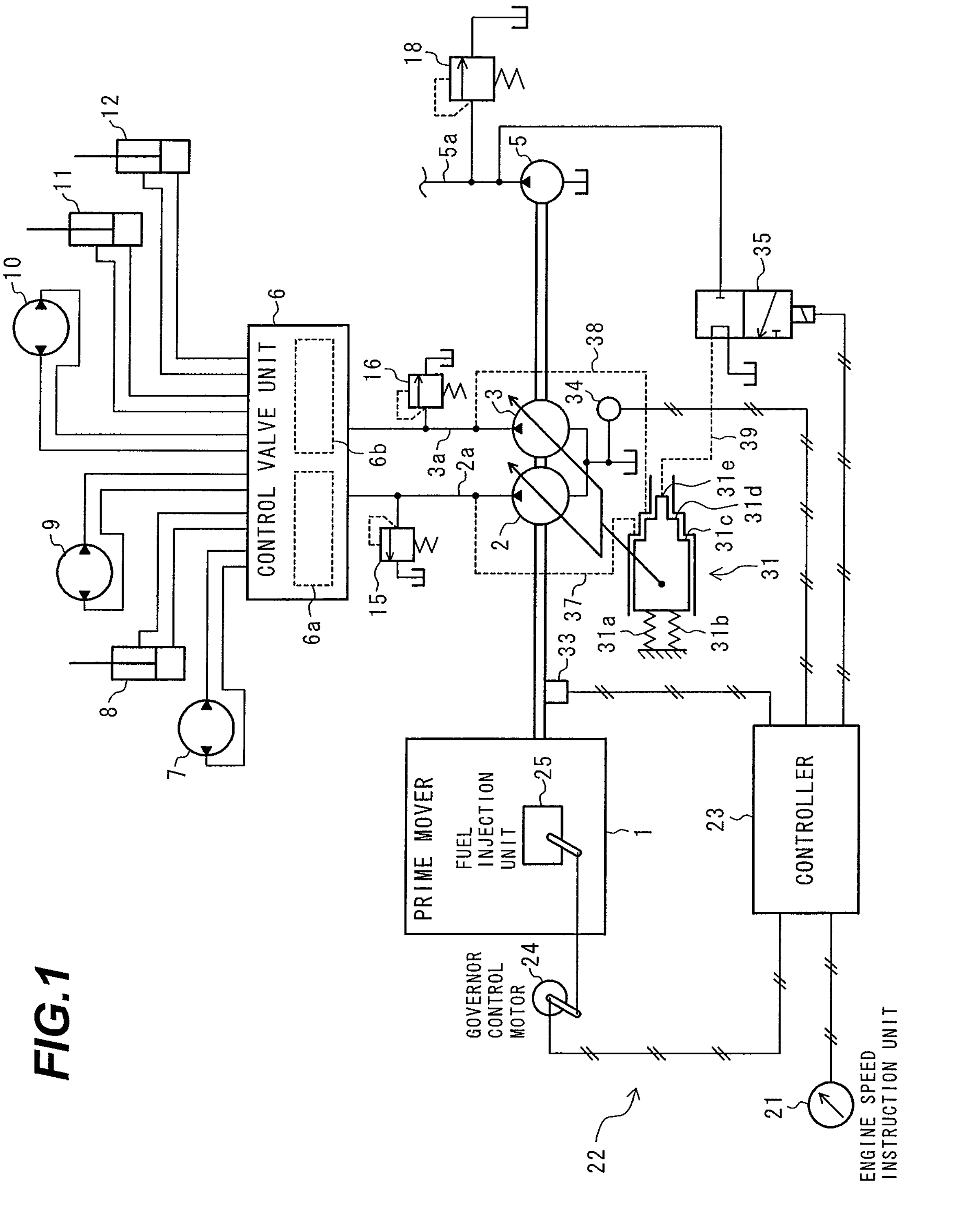
FIG. 1 is a diagram showing the entire configuration of a hydraulic system for a construction machine having a pump torque control system according to a first embodiment of the present invention.

1 Prime mover (engine)
2 First hydraulic pump
3 Second hydraulic pump
6 Control valve unit
6*a*, 6*b*, 6*c* Valve group
7 to 12 A plurality of hydraulic actuators
15, 16 Main relief valve
18 Pilot relief valve
21 Engine speed instruction unit
22 Engine control unit
23 Controller (speed sensing control means)
24 Governor control motor
25 Fuel injection unit
31 Regulator (pump torque control means)
31*a*, 31*b* Spring
31*c*, 31*d*, 31*e* Pressure receiver
31*s* Control spool
33 Engine sensor (speed sensing control means)
34 Hydraulic fluid temperature sensor (hydraulic fluid temperature detection means)
35 Solenoid proportional valve (speed sensing control means)
41 Base torque calculating section
42 Engine speed deviation calculating section
43 Speed sensing control torque calculating section
44 First modification factor calculating section
45 Second modification factor calculating section (first hydraulic fluid temperature modification means)
46 Hydraulic fluid temperature sensor abnormality determination section
47 First switch section
48 Minimum value selecting section
49 Control gain modifying section (first hydraulic fluid temperature modification means)
50 Low pass filter section
51 Engine sensor abnormality determination section
52 Second switch section
53 Hydraulic fluid temperature torque reduction calculating section (second hydraulic fluid temperature modification means)
54 Third switch section
55 Target torque calculating section (second hydraulic fluid temperature modification means)
56 Solenoid valve output pressure calculating section Solenoid valve drive current calculating section
131 Regulator
112, 212 Tilting operation control actuator
113, 213 Torque control servo valve
113*d* Torque reduction control pressure receiver chamber
114, 214 Position control valve

BEST MODE FOR CARRYING OUT THE INVENTION

Embodiments of the present invention will be described below with reference to the accompanying drawings.

FIG. 1 is a diagram showing the entire configuration of a hydraulic system for a construction machine having a pump torque control system according to a first embodiment of the present invention. In the first embodiment, a hydraulic excavator is used as the construction machine.

Referring to FIG. 1, the hydraulic system for the construction machine according to the present embodiment includes a prime mover 1, a first hydraulic pump 2, a second hydraulic pump 3, a pilot pump 5, a control valve unit 6, and hydraulic actuators 7, 8, 9, 10, 11, and 12. The first and second hydraulic pumps 2 and 3 are main pumps. The first and second hydraulic pumps 2 and 3 are of variable displacement type and driven by the prime mover 1. The pilot pump 5 is of fixed displacement type and driven by the prime mover 1. The control valve unit 6 is connected to the first and second hydraulic pumps 2 and 3. Each of the hydraulic actuators 7 to 12 is connected to the control valve unit 6.

The prime mover 1 is a diesel engine. A dial type engine speed instruction unit 21 and an engine control unit 22 are provided for the diesel engine (hereinafter merely referred to as the engine) 1. The engine speed instruction unit 21 is instruction means for instructing the engine 1 to set a target engine speed. The engine control unit 22 has a controller 23, a governor control motor 24, and a fuel injection unit (governor) 25. The controller 23 receives a command signal from the engine speed instruction unit 21 and performs predetermined arithmetic processing. The controller 23 then outputs a drive signal to the governor control motor 24. The governor control motor 24 is rotationally driven in accordance with the drive signal to control the amount of fuel to be injected by the fuel injection unit 25 in order to ensure that the target engine speed instructed by the engine speed instruction unit 21 is obtained.

Main relief valves 15 and 16 are provided in delivery lines 2*a* and 3*a* connected to the first and second hydraulic pumps 2 and 3, respectively. A pilot relief valve 18 is provided in a delivery line 5*a* connected to the pilot pump 5. The main relief valves 15 and 16 control delivery pressure of the first hydraulic pump 2 and delivery pressure of the second hydraulic pump 3, respectively, to set maximum pressure of a main circuit. The pilot relief valve 18 controls the maximum delivery pressure of the pilot pump 5 to set pressure of a pilot hydraulic source.

Figure 2:
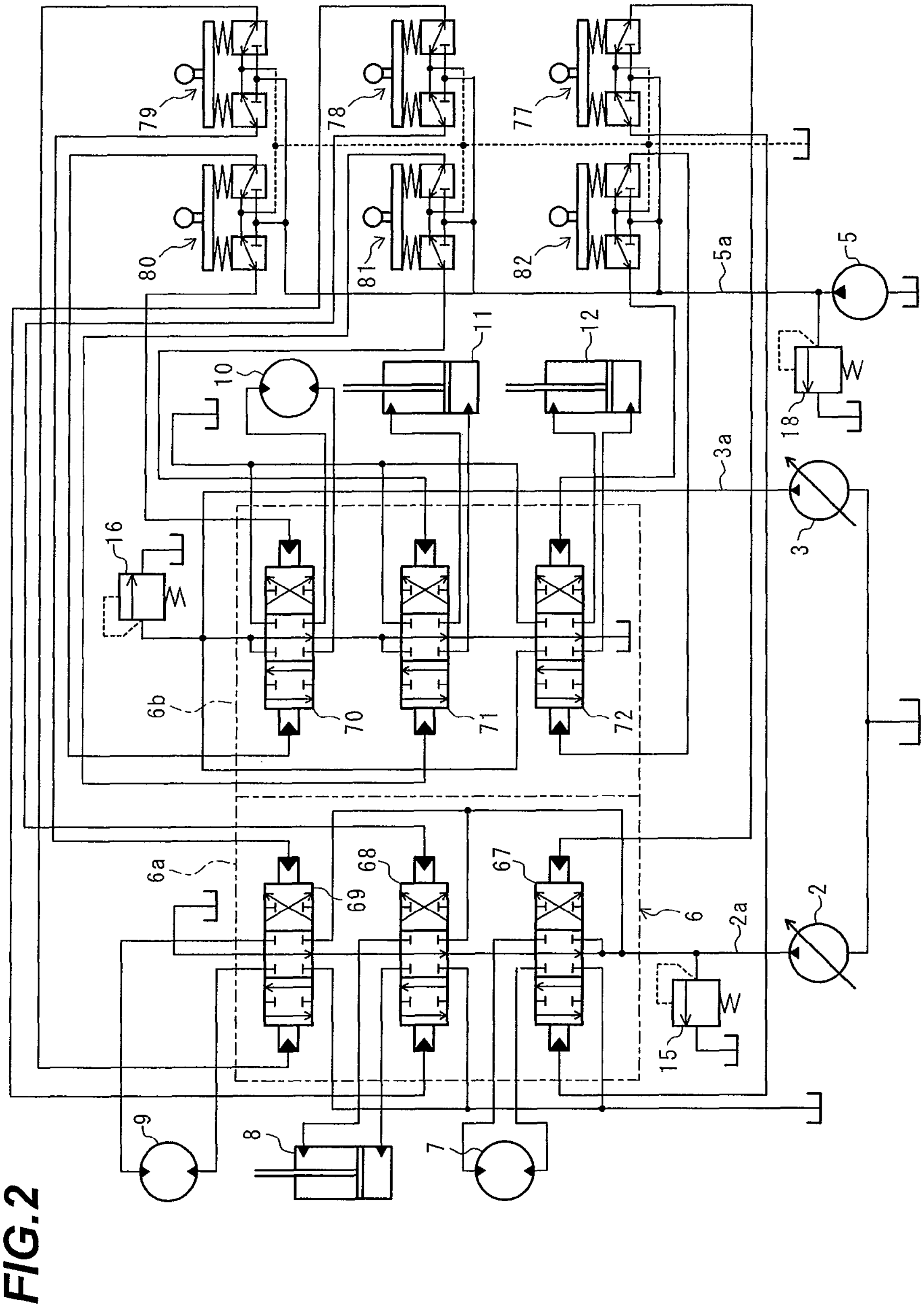
FIG. 2 is a diagram showing details of a control valve unit.

FIG. 2 is a diagram showing details of the control valve unit 6.

The control valve unit 6 has two valve groups 6*a* and 6*b*, which are provided for the first and second hydraulic pumps 2 and 3, respectively. The valve group 6*a* includes flow rate control valves 67, 68, and 69. The valve group 6*b* includes flow rate control valves 70, 71, and 72. The flow rate control valves 67 to 72 control the flows (directions and flow rates) of hydraulic fluids supplied from the first and second hydraulic pumps 2 and 3 to the hydraulic actuators 7, 8, 9, 10, 11, and 12. Control lever units 77, 78, 79, 80, 81, and 82 are provided for the hydraulic actuators 7, 8, 9, 10, 11 and 12, respectively. Each of the control lever units 77, 78, 79, 80, 81, and 82 generates control pilot pressure based on an operation direction and an operation amount of a control lever by using the delivery pressure of the pilot pump 5 as base pressure. The control pilot pressure is transmitted to a pressure receiver of each of the flow control valves 67, 68, 69, 70, 71, and 72. The flow control valves 67, 68, 69, 70, 71, and 72 are switched by means of the control pilot pressure transmitted from the control lever units 77, 78, 79, 80, 81, and 82, respectively. The flow control valves 67, 68, 69, 70, 71, and 72 are of center bypass type. When the control lever units 77, 78, 79, 80, 81, and 82 are not operated and the flow control valves 67, 68, 69, 70, 71, and 72 are set to neutral positions, the delivery lines 2*a* and 3*a* respectively connected to the first and second hydraulic pumps 2 and 3 are communicated with a tank. In this case, the delivery pressure of the first and second hydraulic pumps 2 and 3 is reduced to tank pressure.

The plurality of hydraulic actuators 7, 8, 9, 10, 11, and 12 are, for example, a swing motor of the hydraulic excavator, an arm cylinder, left and right traveling motors, a bucket cylinder, and a boom cylinder. For example, the hydraulic actuator 7 is the swing motor, the hydraulic actuator 8 is the arm cylinder, the hydraulic actuator 9 is the left traveling motor, the hydraulic actuator 10 is the right traveling motor, the hydraulic actuator 11 is the bucket cylinder, and the hydraulic actuator 12 is the boom cylinder.

Referring back to FIG. 1, the pump torque control system according to the present embodiment is provided in the abovementioned hydraulic system. The pump torque control system includes a regulator 31, an engine sensor 33, a hydraulic fluid temperature sensor 34, a solenoid proportional valve 35, and the controller 23. The regulator 31 controls volumes (displacement volumes or tilting of a swash plate) of the first and second hydraulic pumps 2 and 3 to control absorption torques (consumption torques) of the first and second hydraulic pumps 2 and 3. The engine sensor 33 detects an engine speed (actual engine speed) of the engine 1. The hydraulic fluid temperature sensor 34 detects the temperature of the hydraulic fluid, which is a hydraulic fluid delivered by the first and second hydraulic pumps 2 and 3.

The regulator 31 has a control spool 31*s*, springs 31*a* and 31*b*, and pressure receivers 31*c*, 31*d*, and 31*e*. The control spool 31*s* is coupled with variable displacement volume mechanisms of the first and second hydraulic pumps 2 and 3 in an operable manner. The springs 31*a* and 31*b* act on the control spool 31*s* to increase the volumes of the first and second hydraulic pumps 2 and 3. The pressure receivers 31*c*, 31*d*, and 31*e* act on the control spool 31*s* to reduce the volumes of the first and second hydraulic pumps 2 and 3. The pressure receivers 31*c* and 31*d* receives the delivery pressure from the first and second hydraulic pumps 2 and 3 through pilot lines 37 and 38, respectively. The pressure receiver 31*e* receives control pressure from the solenoid proportional valve 35 through a control hydraulic line 39. The springs 31*a* and 31*b* and the pressure receiver 31*e* function as means for setting the maximum absorption torque that can be used by the first and second hydraulic pumps 2 and 3. The regulator 31 having the above-mentioned configuration controls the volumes of the first and second hydraulic pumps 2 and 3 to ensure that the total absorption torque of the first and second hydraulic pumps 2 and 3 does not exceed the maximum absorption torque set by biasing forces of the springs 31*a* and 31*b* and the control pressure introduced to the pressure receiver 31*e*.

The engine sensor 33 outputs a detection signal corresponding to the engine speed of the engine 1. The controller 23 receives the detection signal from the engine sensor 33. The hydraulic fluid temperature sensor 34 outputs a detection signal corresponding to the temperature of the hydraulic fluid. The controller 23 also receives the detection signal from the hydraulic fluid temperature sensor 34. The controller 23 performs predetermined arithmetic processing and outputs a drive signal to the solenoid proportional valve 35. The solenoid proportional valve 35 generates control pressure based on the drive signal output from the controller 23 by using the delivery pressure of the pilot pump 5 as base pressure. The control pressure is introduced to the pressure receiver 31*e* of the regulator 31 through the control hydraulic line 39. The regulator 31 having the abovementioned configuration adjusts the maximum absorption torque that can be used by the first and second hydraulic pumps 2 and 3 based on the control pressure introduced to the pressure receiver 31*e*.

Figure 3:
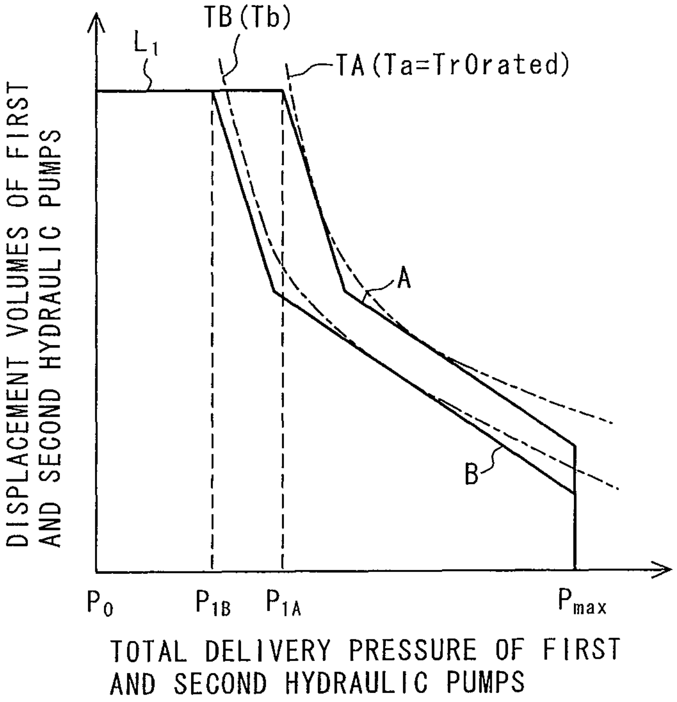
FIG. 3 is a graph showing torque control characteristics of a regulator under the condition that a target engine speed of an engine is equal to a rated engine speed.

FIG. 3 is a graph showing torque control characteristics of the regulator 31 under the condition that a target engine speed of the engine 1 is equal to a rated engine speed. The total delivery pressure of the first and second hydraulic pumps 2 and 3 is plotted along the abscissa axis of the graph. The displacement volumes (displacement volume or tilting of the swash plate) of the first and second hydraulic pumps 2 and 3 are plotted along the ordinate axis of the graph. In FIG. 3, broken lines A and B are characteristic lines of absorption torque control (input torque limitation control) performed by the regulator 31. The broken line A is the characteristic line under the condition that the maximum absorption torque of the first and second hydraulic pumps 2 and 3 is set to a base torque Tr0*rated* (described later). The broken line B is the characteristic line under the condition that the maximum absorption torque of the first and second hydraulic pumps 2 and 3 is set to a value lower than the base torque Tr0*rated* by the speed sensing control (described later).

When the maximum absorption torque of the first and second hydraulic pumps 2 and 3 is set to the base torque, the displacement volumes of the first and second hydraulic pumps 2 and 3 are changed as follows based on the total delivery pressure of the first and second hydraulic pumps 2 and 3.

When the total delivery pressure of the first and second hydraulic pumps 2 and 3 is in a range from a value P0 to a value P1A, the absorption torque control is not performed, and the displacement volumes of the first and second hydraulic pumps 2 and 3 are present on a maximum volume characteristic line L1 and are the maximum (constant). In this case, the absorption torques of the first and second hydraulic pumps 2 and 3 are increased as the delivery pressure of the first and second hydraulic pumps 2 and 3 is increased. When the total delivery pressure of the first and second hydraulic pumps 2 and 3 exceeds the value P1A, the absorption torque control is performed, and the displacement volumes of the first and second hydraulic pumps 2 and 3 are reduced in accordance with the characteristic line A. In this way, the absorption torques of the first and second hydraulic pumps 2 and 3 are controlled to ensure that the total absorption torque of the first and second hydraulic pumps 2 and 3 does not exceed the base torque Ta (=Tr0*rated*) indicated by a constant torque curved line TA. In this case, the pressure P1A is a value immediately before the absorption torque control is performed by the regulator 31. The range from the value P1A to a value Pmax is a range of the total delivery pressure of the first and second hydraulic pumps 2 and 3 when the absorption torque control is performed by the regulator 31. The value Pmax is the maximum value of the total delivery pressure of the first and second hydraulic pumps 2 and 3 and is a value corresponding to the total relief set pressure of the main relief valves 15 and 16. When the total delivery pressure of the first and second hydraulic pumps 2 and 3 reaches the value Pmax, the main relief valves 15 and 16 are operated to prevent a further increase in the total delivery pressure of the first and second hydraulic pumps 2 and 3.

When the maximum absorption torque of the first and second hydraulic pumps 2 and 3 is set to a value lower than the base torque by the speed sensing control (described later), the absorption torque control is performed in accordance with the characteristic line B instead of the characteristic line A. In accordance with the characteristic line B, the absorption torque control starts to be performed by the regulator 31 when the total delivery pressure of the first and second hydraulic pumps 2 and 3 is equal to a value P1B. In this case, the absorption torque control is performed by the regulator 31 under the condition that the total delivery pressure of the first and second hydraulic pumps 2 and 3 is in a range from the value P1B to the value Pmax. Therefore, the maximum absorption torque that can be used by the first and second hydraulic pumps 2 and 3 is reduced from Ta to Tb.

The engine sensor 33, the hydraulic fluid temperature sensor 34, the solenoid proportional valve 35, and processing functions (related to the pump torque control system) of the controller 23 constitute speed sensing control means for the pump absorption torque control.

Figure 4:
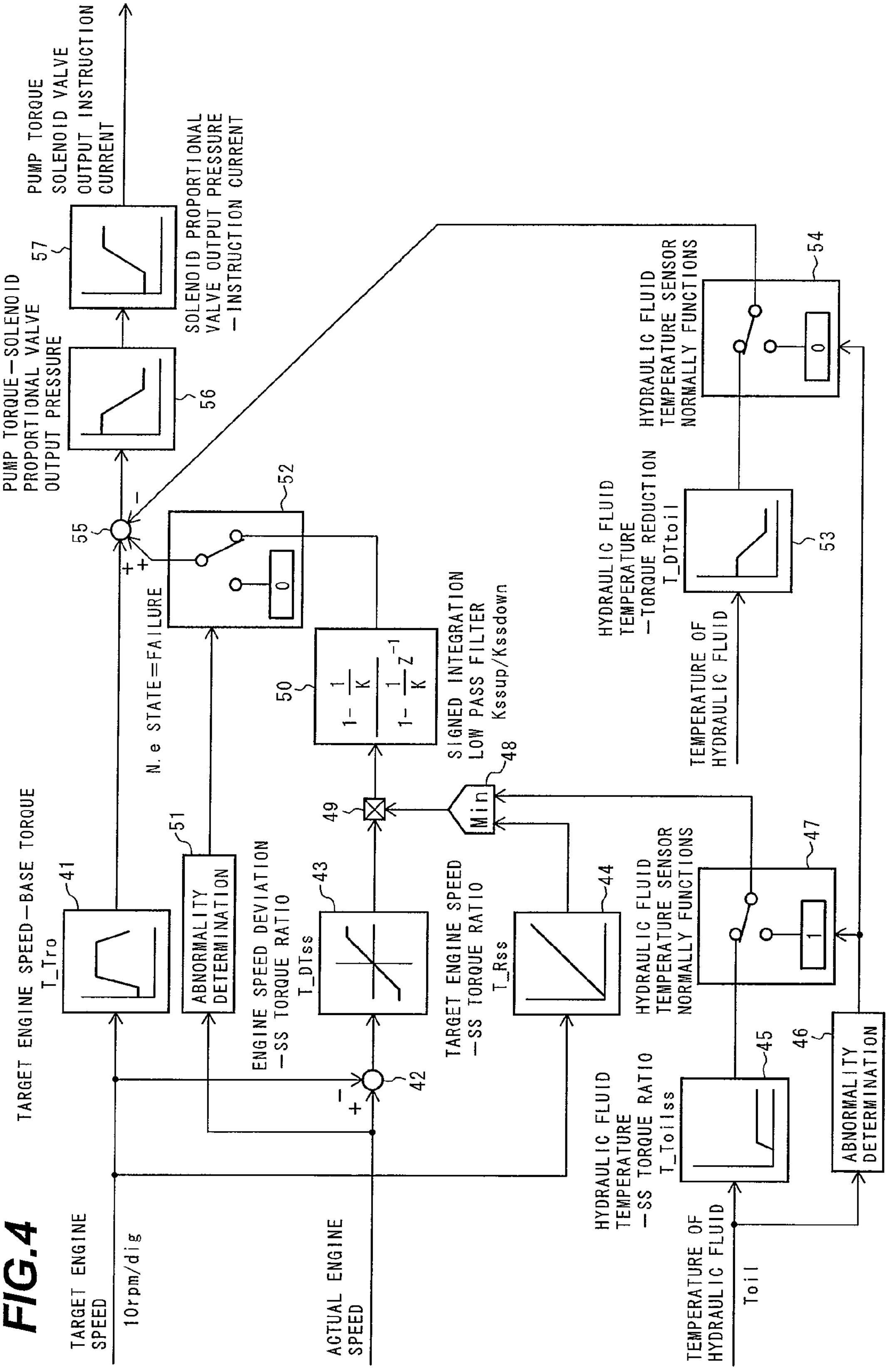
FIG. 4 is a block diagram showing processing functions of a controller, which are related to the pump torque control system.

FIG. 4 is a block diagram showing the processing functions of the controller 23, which are related to the pump torque control system. The controller 23 includes a base torque calculating section 41, an engine speed deviation calculating section 42, a speed sensing control torque calculating section (hereinafter referred to as an SS control torque calculating section) 43, a first modification factor calculating section 44, a second modification factor calculating section 45, a hydraulic fluid temperature sensor abnormality determination section 46, a first switch section 47, a minimum value selecting section 48, a control gain modifying section 49, a low pass filter section 50, an engine sensor abnormality determination section 51, a second switch section 52, a hydraulic fluid temperature torque reduction calculating section 53, a third switch section 54, a target torque calculating section 55, a solenoid valve output pressure calculating section 56, and a solenoid valve drive current calculating section 57.

The base torque calculating section 41 calculates the total maximum absorption torque that can be used by the first and second hydraulic pumps 2 and 3 as a base torque Tr0 based on a target engine speed Nr of the engine 1. This calculation is performed, for example, by the following operations: the controller 23 receives a command signal indicating the target engine speed Nr from the engine speed instruction unit 21; the received command signal is referenced by using a table stored in a memory; and the base torque calculating section 41 calculates a base torque Tr0 corresponding to the target engine speed Nr indicated by the command signal. The base torque Tr0 is set as a value falling within the range of a torque output from the engine 1. The relationship between the target engine speed Nr and the base torque Tr0 is set in the table stored in the memory. The relationship between the target engine speed Nr and the base torque Tr0 is established to ensure that the base torque Tr0 is reduced as the target engine speed Nr is reduced based on a change in the torque output from the engine 1.

The engine speed deviation calculating section 42 reduces the target engine speed Nr from the engine speed (actual engine speed) Ne of the engine 1 detected by the engine sensor 33 to calculate an engine speed deviation ΔN.

$$\Delta N = Ne - Nr \tag{1}$$

The SS control torque calculating section 43 calculates, based on the engine speed deviation ΔN, a first order modification torque ΔTs1, which is a first order torque reduction amount (first torque reduction amount) for the speed sensing control. This calculation is performed, for example, by the following operations: the SS control torque calculating section 43 multiplies the engine speed deviation ΔN by a gain Ks of the speed sensing control; the SS control torque calculating section 43 performs upper limit processing and the lower limit processing; and the SS control torque calculating section 43 calculates the first order modification torque ΔTs1 for the speed sensing control.

The first modification factor calculating section 44 calculates, based on the target engine speed Nr, a first modification factor (engine speed modification value) Kn to be used to modify a torque reduction amount for the speed sensing control. This calculation is performed, for example, by the following operations: the target engine speed Nr is referenced by using the table stored in the memory; and the first modification factor calculating section 44 calculates the first modification factor Kn corresponding to the target engine speed Nr.

Figure 5:
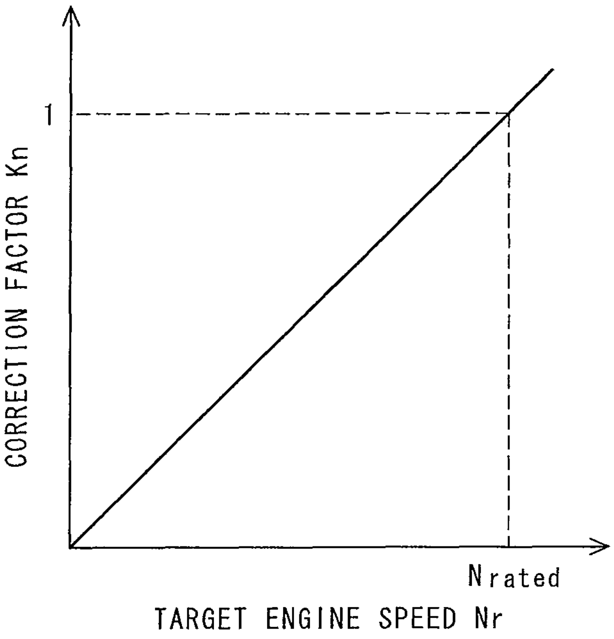
FIG. 5 is a graph showing the relationship between a target engine speed Nr and a rated engine speed.

FIG. 5 is a graph showing the relationship between the target engine speed Nr and the first modification factor Kn. The relationship between the target engine speed Nr and the first modification factor Kn is set in the table stored in the memory. The relationship between the target engine speed Nr and the first modification factor Kn is established to ensure that when the target engine speed Nr is equal to the rated engine speed Nrated, the first modification factor Kn is 1 and that the first modification factor Kn is reduced from 1 in proportion to a reduction in the target engine speed Nr from the rated engine speed Nrated.

The second modification factor calculating section 45 calculates, based on the temperature Tf of the hydraulic fluid, a second modification factor (temperature modification value) Kt to be used to modify a torque reduction amount to be used for the speed sensing control. This calculation is performed, for example, by the following operations: the controller 23 receives a detection signal indicating the temperature Tf of the hydraulic fluid from the hydraulic fluid temperature sensor 34; the received detection signal is referenced by using the table stored in the memory; and the second modification factor calculating section 45 calculates the second modification factor Kt corresponding to the temperature Tf of the hydraulic fluid indicated by the detection signal.

Figure 6:
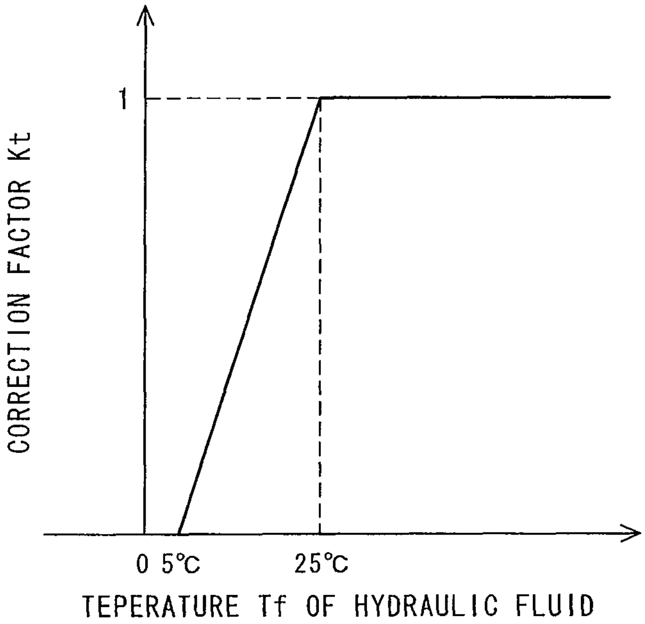
FIG. 6 is a graph showing the relationship between the temperature Tf of a hydraulic fluid and a second modification factor Kt.

FIG. 6 is a graph showing the relationship between the temperature Tf of the hydraulic fluid and the second modification factor Kt. The relationship between the temperature Tf of the hydraulic fluid and the second modification factor Kt is set in the table stored in the memory. The relationship between the temperature Tf of the hydraulic fluid and the second modification factor Kt is established to ensure that: the second modification factor Kt is 1 when the temperature Tf of the hydraulic fluid is 25° C. or more; the second modification factor Kt is 0 when the temperature Tf of the hydraulic fluid is 5° C. or less; and the second modification factor Kt is reduced from 1 to 0 in proportion to a reduction in the temperature Tf of the hydraulic fluid from 25° C. to 5° C.

The hydraulic fluid temperature sensor abnormality determination section 46 receives the detection signal indicating the temperature Tf of the hydraulic fluid from the hydraulic fluid temperature sensor 34 and determines whether or not the hydraulic fluid temperature sensor 34 normally functions. The determination is performed, for example, by the following operations: an allowable range of the maximum value of the detection signal transmitted by the hydraulic fluid temperature sensor 34 normally functioning is set; and the hydraulic fluid temperature sensor abnormality determination section 46 determines whether or not the detection signal indicates a value falling within the allowable range. When the detection signal indicates a value out of the allowable range, the hydraulic fluid temperature sensor abnormality determination section 46 determines that the hydraulic fluid temperature sensor 34 does not normally function (is in an abnormal state).

The first switch section 47 switches the value of the second modification factor Kt based on the result of the determination performed by the hydraulic fluid temperature sensor abnormality determination section 46. When the result of the determination performed by the hydraulic fluid temperature sensor abnormality determination section 46 indicates a "normal" condition, the first switch section 47 outputs the modification factor Kt calculated by the second modification factor calculating section 45 without changing the modification factor Kt. When the result of the determination performed by the hydraulic fluid temperature sensor abnormality determination section 46 indicates an "abnormal" condition, the first switch section 47 outputs a value of "1" as the second modification factor Kt.

The minimum value selecting section 48 selects a smaller one of the first modification factor Kn calculated by the first modification factor calculating section 44 and the second modification factor Kt output from the first switch section 47 and outputs the selected value as a modification factor Kc for control.

The control gain modifying section 49 is a multiplication section. The control gain modifying section 49 multiplies the modification factor Kc output from the minimum value selecting section 48 by the first order modification torque ΔTs1 (for the speed sensing control) calculated by the SS control torque calculating section 43 to calculate a second modification torque ΔTs2, which is a second order torque reduction amount (first torque reduction amount) for the speed sensing control. When the minimum value selecting section 48 selects the second modification factor Kt, the second modification torque ΔTs2 is equal to the first modification torque ΔTs1 modified based on the temperature of the hydraulic fluid.

As described above, the control gain modifying section 49 calculates the second modification torque ΔTs2 for the speed sensing control by multiplying the modification factor Kc output from the minimum value selecting section 48 by the first order modification torque ΔTs1 (for the speed sensing control) calculated by the SS control torque calculating section 43. The calculation performed by the control gain modifying section 49 means the modification of the gain Ks (of the speed sensing control) used by the SS control torque calculating section 43.

The low pass filter section 50 performs low pass filter processing on the second modification torque ΔTs2 for the speed sensing control to remove a high frequency component (noise) and calculates a modification torque ΔTs3, which is the final torque reduction amount (first torque reduction amount) for the speed sensing control.

The engine sensor abnormality determination section 51 receives a detection signal indicating the engine speed Nr of the engine from the engine sensor 33 and determines whether or not the engine sensor 33 normally functions. The determination is performed, for example, by the following operations: an allowable range of the maximum value of the detection signal transmitted by the engine sensor 33 normally functioning is set; and the engine sensor abnormality determination section 51 determines whether or not the detection signal indicates a value falling within the allowable range. When the detection signal indicates a value out of the allowable range, the engine sensor abnormality determination section 51 determines that the engine sensor 33 does not normally function (is in an abnormal state).

The second switch section 52 is adapted to switch the value of the modification torque ΔTs3 for the speed sensing control based on the result of the determination performed by the engine sensor abnormality determination section 51. When the result of the determination performed by the engine sensor abnormality determination section 51 indicates a "normal" condition, the second switch section 52 outputs the modification torque ΔTs3 calculated by the low pass filter section 50 without changing the modification torque ΔTs3. When the result of the determination performed by the engine sensor abnormality determination section 51 indicates an "abnormal" condition, the second switch section 52 outputs a value of "0" as the modification torque ΔTs3.

The hydraulic fluid temperature torque reduction calculating section 53 calculates, based on the temperature Tf of the hydraulic fluid, a torque reduction amount (second torque reduction amount) to be used to modify the degree of a target torque for the pump torque control. The calculation is performed, for example, by the following operations: the controller 23 receives a detection signal indicating the temperature Tf of the hydraulic fluid from the hydraulic fluid temperature sensor 34; the detection signal is referenced by using the table stored in the memory; the hydraulic fluid temperature torque reduction calculating section 53 calculates a torque reduction amount Td corresponding to the temperature Tf of the hydraulic fluid indicated by the detection signal.

Figure 7:
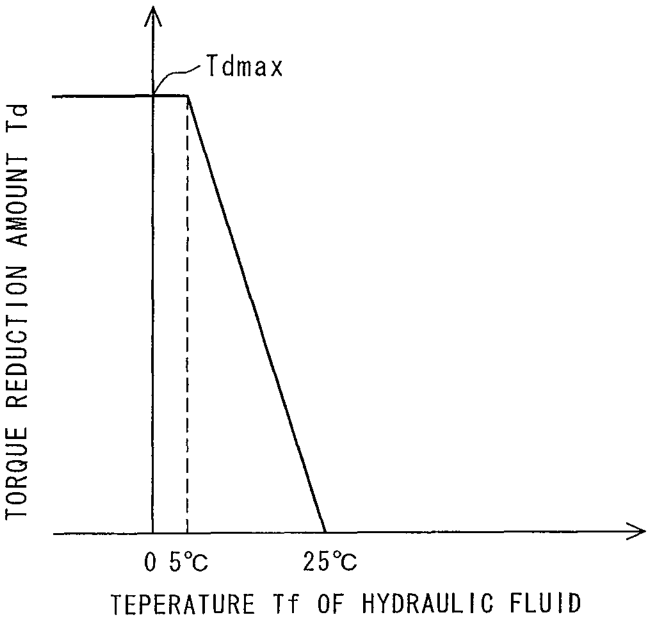
FIG. 7 is a graph showing the relationship between the temperature Tf of the hydraulic fluid and a torque reduction amount Td.

FIG. 7 is a graph showing the relationship between the temperature Tf of the hydraulic fluid and a torque reduction amount Td. The relationship between the temperature Tf of the hydraulic fluid and the torque reduction amount Td is set in the table stored in the memory. The relationship between the temperature Tf of the hydraulic fluid and the torque reduction amount Td is established to ensure that: the torque reduction amount Td is 0 when the temperature Tf of the hydraulic fluid is 25° C. or more; the torque reduction amount Td is the maximum Tdmax when the temperature Tf of the hydraulic fluid is 5° C. or less; and the torque reduction amount Td is increased from 0 to the maximum Tdmax in proportion to a reduction in the temperature Tf of the hydraulic fluid from 25° C. to 5° C.

The third switch section 54 is adapted to switch the value of the torque reduction amount Td based on the result of the determination performed by the hydraulic fluid temperature sensor abnormality determination section 46. When the result of the determination performed by the hydraulic fluid temperature abnormality determination section 46 indicates a "normal" condition, the third switch section 54 outputs the torque reduction amount Td calculated by the hydraulic fluid temperature torque reduction calculating section 53 without changing the torque reduction amount Td. When the result of the determination performed by the hydraulic fluid temperature sensor abnormality determination section 46 indicates an "abnormal" condition, the third switch section 54 outputs a value of "0" as the torque reduction amount Td.

The target torque calculating section 55 adds the base torque Tr0 calculated by the base torque calculating section 41 to the modification torque (first torque reduction amount) ΔTs3 (for the speed sensing control) selected by the second switch section 52 (the target torque calculating section 55 reduces an absolute value of the modification torque (first torque reduction amount) ΔTs3 from the base torque Tr0) to calculate a target torque Tr1 modified by the speed sensing control. In addition, the target torque calculating section 55 reduces the torque reduction amount (second torque reduction amount) Td selected by the third switch section 54 from the target torque Tr1 to calculate a target torque Tr2 for the pump torque control. That is, the target torque calculating section 55 performs the following calculations.

$$Tr1=Tr0+\Delta Ts3 \tag{2}$$

$$Tr2=Tr1-Td \tag{3}$$

The target torque calculating section 55 may obtain the target torque Tr2 through one calculation. In this case, the target torque calculating section 55 performs the following calculation.

$$Tr2=Tr0+\Delta Ts3-Td \tag{4}$$

The solenoid valve output pressure calculating section 56 calculates control pressure to be used to set, in the regulator 31, the target torque Tr2 as the maximum absorption torque that can be used by the first and second hydraulic pumps 2 and 3. The target torque Tr2 calculated by the target torque calculating section 55 is referenced by using the table stored in the memory. The solenoid valve output pressure calculating section 56 calculates pressure Pc output from the solenoid proportional valve 35 and corresponding to the target torque Tr2. The relationship between the target torque Tr2 and the output pressure Pc is set in the table stored in the memory and is established to ensure that the output pressure Pc is reduced as the target torque Tr2 is increased.

The solenoid valve drive current calculating section 57 calculates a drive current Ic supplied to the solenoid proportional valve 35. The drive current Ic is used to obtain the pressure Pc, which is calculated by the solenoid valve output pressure calculating section 56 and output from the solenoid proportional valve 35. The pressure Pc calculated by the solenoid valve output pressure calculating section 56 and output from the solenoid proportional valve 35 is referenced by using the table stored in the memory. The solenoid valve drive current calculating section 57 then calculates the drive current Ic (supplied to the solenoid proportional valve 35) corresponding to the output pressure Pc. The relationship between the output pressure Pc and the drive current Ic is set in the table stored in the memory and is established to ensure that the drive current Ic is increased as the output pressure Pc is increased. The drive current Ic is amplified by an amplifier (not shown) and output to the solenoid proportional valve 35.

As described above, the regulator 31 constitutes pump absorption torque control means for controlling the displacement volumes of the hydraulic pumps 2 and 3 to ensure that the total absorption torque of the first and second hydraulic pumps 2 and 3 does not exceed the maximum absorption torque set in the regulator 31. The engine sensor 33, the hydraulic fluid temperature sensor 34, the solenoid proportional valve 35, and the functions (shown in FIG. 4) of the controller 23 constitute the speed sensing control means for calculating the first torque reduction amount ΔTs3 based on the deviation between the target engine speed of the prime mover 1 and the actual engine speed of the prime mover 1 and performing control to reduce the maximum absorption torque (of the hydraulic pumps 2 and 3) set in the pump absorption torque control means (regulator 31) based on the first torque reduction amount ΔTs3. Of the functions (shown in FIG. 4) of the controller 23, the second modification factor calculating section 45 and the control gain modifying section 49 constitute first hydraulic fluid temperature modification means for modifying a control gain to be used to calculate the first torque reduction amount ΔTs3 to ensure that the first torque reduction amount ΔTs3 is reduced as the temperature of the hydraulic fluid detected by the hydraulic fluid temperature detection means (hydraulic fluid temperature sensor 34) is reduced.

Next, operations of the pump torque control system having the abovementioned configuration according to the present embodiment will be described.

As an operation using a hydraulic excavator, there is a heavy load operation including an excavating operation. When such a heavy load operation is started, load pressure applied to any of the hydraulic actuators 7, 8, 9, 10, 11, and 12 is rapidly increased. The delivery pressure of at least one of the first and second hydraulic pumps 2 and 3 is also rapidly increased. In this case, a load applied to the engine 1 is temporarily increased, and the engine speed (actual engine speed) Ne of the engine 1 is reduced to a level lower than the target engine speed Nr (rated engine speed Nrated). When the engine speed Ne of the engine 1 is reduced, the controller 23 generates, based on the deviation between the actual engine speed Ne of the engine 1 and the target engine speed Nr, a drive signal to be used to increase the amount of fuel to be injected. The controller 23 transmits the drive signal to the governor control motor 24 to cause the governor control motor 24 to be rotationally driven. The governor control motor 24 increases the amount of the fuel to be injected by the fuel injection unit 25. The controller 23 performs control to increase an output torque of the engine 1.

On the other hand, in the pump torque control system according to the present embodiment, the regulator 31 is operated to control the displacement volumes of the first and second hydraulic pumps 2 and 3 in order to ensure that the total absorption torque of the first and second hydraulic pumps 2 and 3 does not exceed the maximum absorption torque (base torque) indicated by the constant torque curved line TA as shown in FIG. 3. The load applied to the engine 1 is therefore limited to be equal to or lower than the maximum absorption torque.

In this case, the speed sensing control means functions to temporarily reduce the maximum absorption torque (along the broken line B shown in FIG. 3) set by the biasing forces of the springs 31*a* and 31*b* and the control pressure introduced to the pressure receiver 31*e* in order to reduce the load applied to the engine 1. The engine 1 is controlled to quickly increase the engine speed without an engine stall due to the reduction in the load applied to the engine 1 and the control on the amount of the fuel to be injected to the engine 1.

In the present embodiment, when the temperature of the hydraulic fluid is low and the viscosity of the hydraulic fluid is high, the control gain (torque reduction amount ΔTs3) for the speed sensing control is modified based on the temperature of the hydraulic fluid. The amount of a controlled pump torque under the speed sensing control is reduced. This can suppress a response delay in the speed sensing control due to the delay of output of the control pressure output from the solenoid proportional valve 35, the delay of the pump tilting operation by means of the regulator 31 or the like and prevent a resonance between a fluctuating frequency of the pump torque due to the speed sensing control and a fluctuating frequency of the engine speed of the engine 1 due to the control on the amount of the fuel to be injected. This makes it possible to prevent from hunting due to interference between the speed sensing control and the control on the engine speed of the engine 1 and perform appropriate pump torque control.

The details will be described below.

Figure 8:
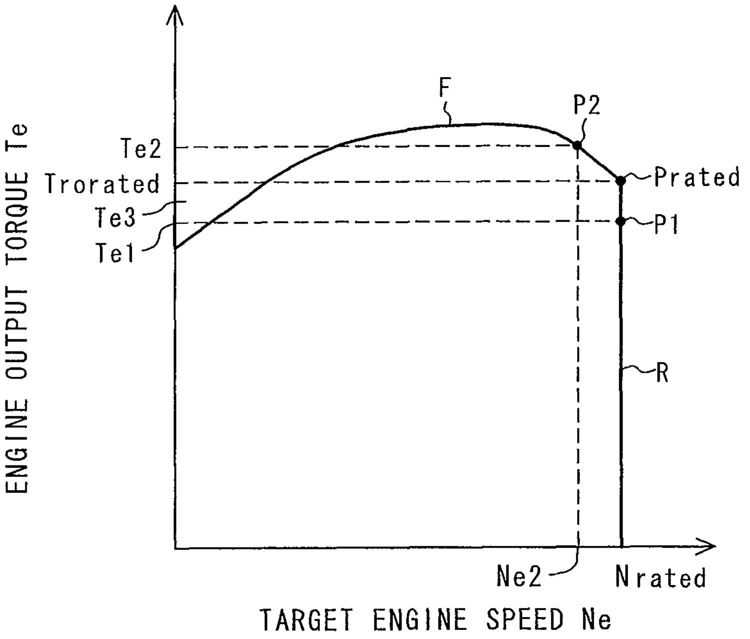
FIG. 8 is a graph showing an example of output characteristics of the engine under the condition that the target engine speed of the engine is equal to the rated engine speed Nrated.

FIG. 8 is a graph showing an example of output characteristics of the engine 1 under the condition that the target engine speed of the engine 1 is equal to the rated engine speed Nrated. In FIG. 8, the actual engine speed of the engine 1 is plotted along the abscissa axis, a torque Te output from the engine 1 is plotted along the ordinate axis. A symbol R indicates a characteristic line showing a regulation region controlled by the fuel injection unit 25. A symbol F indicates a characteristic line showing a full load region in which the amount of the fuel to be injected by the fuel injection unit 25 is the maximum. A point Prated is a rated point at which the amount of the fuel to be injected by the fuel injection unit 25 is the maximum, and which is present on the line of the regulation region R. The engine speed Ne corresponding to the rated point Prated is set as the target engine speed (rated engine speed Nrated). The fuel injection unit 2 is adapted to control the amount of the fuel to be injected to ensure that the engine speed Ne of the engine 1 indicated by the line of the regulation region R is nearly constant as an example. The characteristics of the regulation region R are called isochronous characteristics. In the present embodiment, as an example, the base torque Tr0*rated* calculated by the base torque calculating section 41 and obtained when the target engine speed is equal to the rated engine speed Nrated is set to be equal to the torque output from the engine 1, which corresponds to the rated point Prated.

In FIG. 8, when loads applied to the first and second hydraulic pumps 2 and 3 are normal and the torque output from the engine 1 is lower than the output torque Tr0*rated* corresponding to the rated point Prated, the engine 1 is operated with the output torque and the engine speed, which correspond to a point P1 present on the regulation region R. When such a heavy load operation as described above is started from the state where the engine 1 is operated with the output torque and the engine speed, which correspond to a point P1 present on the regulation region R, an operation point of the engine 1 moves from the point P1 to, for example, a point P2 present on the characteristic line F showing the full load region. The torque output from the engine 1 is increased to a value of Te2. When the operation point of the engine 1 moves from the point P1 to the point P2, the speed sensing control means according to the present embodiment performs the following operations when the temperature of the hydraulic fluid detected by the hydraulic fluid temperature sensor 34 is in a range of a normal temperature (for example, 50° C. to 70° C.) and when the temperature of the hydraulic fluid detected by the hydraulic fluid temperature sensor 34 is lower than the normal temperature. In both cases, it is assumed that the target engine speed of the engine 1 instructed by the engine speed instruction unit 21 is equal to the rated engine speed Nrated, and the engine sensor 33 and the hydraulic fluid temperature sensor 34 normally function.

<When the temperature of the hydraulic fluid detected by the hydraulic fluid temperature sensor 34 is in the range of the normal temperature (for example, 50° C. to 70° C.)>

Since the target engine speed of the engine 1 is equal to the rated engine speed Nrated, the base torque calculating section 41 included in the controller 23 calculates the torque Tr0*rated* corresponding to the rated engine speed Nrated as the base torque Tr0.

Since the operation point of the engine 1 is located at the point P1 present on the line of the regulation region R at the beginning, the engine speed Ne of the engine 1 is nearly equal to the target engine speed Nr (rated engine speed Nrated). The engine speed deviation calculating section 42 performs a calculation to obtain the engine speed deviation ΔN nearly equal to zero. As a result, the SS control torque calculating section 43 performs a calculation to obtain the first order modification torque ΔTs1 of the speed sensing control, which is nearly equal to zero. The modification torque (first torque reduction amount) ΔTs3 calculated by the low pass filter section 50 is therefore nearly equal to zero regardless of values calculated by the first and second modification factor calculating sections 44 and 45.

The hydraulic fluid temperature torque reduction calculating section 53 performs a calculation to obtain the torque reduction amount (second torque reduction amount) Td equal to zero since the temperature Tf of the hydraulic fluid is in the range of the normal temperature (for example, 50° C. to 70° C.).

Furthermore, the target torque calculating section 55 performs a calculation to obtain the target torque Tr2 equal to the base torque Tr0*rated* since both the modification torque ΔTs3 and the torque reduction amount Td are zero. The target torque Tr2 is processed by the solenoid valve output pressure calculating section 56 and the solenoid valve drive current calculating section 57, and the solenoid proportional valve 35 is driven to output control pressure corresponding to the pressure receiver 31*e* included in the regulator 31. In this way, the maximum absorption torque corresponding to the target torque Tr2 (=Tr0*rated*) is set in the regulator 31 by the biasing forces of the springs 31*a* and 31*b* and the control pressure introduced to the pressure receiver 31*e*.

The maximum absorption torque set in the regulator 31 in the abovementioned case is described above with reference to FIG. 3. That is, the constant torque curved line TA is equal to the base torque Tr0*rated* which is the target torque Tr2, and a characteristic line indicating the absorption torque control performed by the regulator 31 is set to a line similar to the broken line A. In this case, the torque output from the engine 1 is a value Te1 corresponding to the operation point P1. Since the torque Te1 is smaller than the base torque Tr0*rated*, the first and second hydraulic pumps 2 and 3 are operated with the displacement volumes and the total delivery pressure which correspond to a range surrounded by the broken line A and the maximum volume characteristic line L1 and present on the constant torque curved line TA corresponding to the output torque Te1 of the engine 1.

When the load applied to the engine 1 is increased due to such a heavy load operation as described above from the abovementioned state, and the operation point of the engine 1 moves from the point P1 in FIG. 8 to, for example, the point P2 present on the characteristic line F of the full load region, the engine speed Ne of the engine 1 is reduced from the rated engine speed Nrated to a value Ne2. In this case, the engine speed deviation calculating section 42 performs a calculation to obtain the engine speed deviation ΔN (Ne–Nr), which is a negative value. In addition, the SS control torque calculating section 43 calculates the first order modification torque ΔTs1 (for the speed sensing control) corresponding to the engine speed deviation ΔN. Furthermore, the first modification factor calculating section 44 performs a calculation to obtain the first modification factor Kn equal to 1 since the target engine speed Nr is equal to the rated engine speed Nrated. The second modification factor calculating section 45 performs a calculation to obtain the second modification factor Kt equal to 1 since the temperature Tf of the hydraulic fluid is in the range of the normal temperature (for example, 50° C. to 70° C.). The minimum selecting section 48 selects the modification factor Kc, which is equal to 1.

The control gain modifying section 49 performs a calculation to obtain the second order modification torque ΔTs2 equal to the first order modification torque ΔTs1 for the speed sensing control. The low pass filter section 50 calculates the modification torque ΔTs3 (for the speed sensing control) corresponding to the second order modification torque ΔTs2 (=ΔTs1).

The hydraulic fluid temperature torque reduction calculating section 53 performs a calculation to obtain the torque reduction amount Td equal to zero since the temperature Tf of the hydraulic fluid is in the range of the normal temperature (for example, 50° C. to 70° C.). The target torque calculating section 55 calculates the target torque Tr2 as follows.

$$Tr1=Tr0\text{rated}+\Delta Ts3$$

$$Tr2=Tr1-Td=Tr1=Tr0\text{rated}+\Delta Ts3$$

That is, the target torque Tr2 is reduced to a value lower by the modification torque ΔTs3 than the base torque Tr0*rated*. The target torque Tr2 is processed by the solenoid valve output pressure calculating section 56 and the solenoid valve drive current calculating section 57. The solenoid proportional valve 35 is driven to output control pressure corresponding to the target torque Tr2 to the pressure receiver 31*e* included in the regulator 31.

The output pressure Pc calculated by the solenoid valve output pressure calculating section 56 is in inverse proportion to the target torque Tr2. In the regulator 31, therefore, the control pressure introduced to the pressure receiver 31*e* is increased by the value ΔTs3, and the maximum absorption torque set by the biasing forces of the springs 31*a* and 31*b* and the control pressure introduced to the pressure receiver 31*e* is reduced based on the increase in the control pressure.

The change in the maximum absorption torque set by the regulator 31 corresponds to the change of the characteristic line for the absorption torque control from the broken line A to the broken line B. In FIG. 3, the constant torque curved line TB is lower by the modification torque ΔTs3 than the base torque Tr0*rated*, and the characteristic line for the absorption torque control performed by the regulator 31 is the broken line B. Since the target torque Tr2 is reduced to a value lower by the modification torque ΔTs3 than the base torque Tr0*rated*, the characteristic line for the absorption torque control is shifted from the broken line A to the broken line B. The first and second hydraulic pumps 2 and 3 are operated in accordance with the broken line B.

Since the characteristic line for the absorption torque control is shifted from the broken line A to the broken line B and the maximum absorption torque set in the regulator 31 is reduced, the load applied to the engine 1 is reduced. The engine 1 can quickly increase the engine speed thereof due to the control on the amount of the fuel to be injected by the fuel injection unit 25.

<The temperature of the hydraulic fluid detected by the hydraulic fluid temperature sensor 34 is lower than 25° C.>

When the operation point of the engine 1 is located at the point P1 present on the line of the regulation region R, the engine speed deviation calculating section 42 performs a calculation to obtain the engine speed deviation ΔN nearly equal to zero since the engine speed Ne of the engine 1 is nearly equal to the target engine speed Nr (rated engine speed Nrated). Similarly to the case where the temperature of the hydraulic fluid is in the range of the normal temperature, the modification torque ΔTs3 calculated by the low pass filter section 50 is nearly equal to zero regardless of values calculated by the first and second modification factor calculating sections 44 and 45.

The hydraulic fluid temperature torque reduction calculating section 53 performs a calculation to obtain the torque reduction amount Td corresponding to the temperature Tf of the hydraulic fluid, which is larger than zero since the temperature Tf of the hydraulic fluid is lower than 25° C. The target torque calculating section 55 calculates the target torque Tr2 as follows.

$$Tr1=Tr0\text{rated}+\Delta Ts3=Tr0\text{rated}$$

$$Tr2=Tr1-Td=Tr0\text{rated}-Td$$

That is, the target torque Tr2 is reduced to a value lower by the torque reduction amount Td than the base torque Tr0*rated*. The target torque Tr2 is processed by the solenoid valve output pressure calculating section 56 and the solenoid valve drive current calculating section 57. The solenoid proportional valve 35 is driven to output control pressure corresponding to the target torque Tr2 to the pressure receiver 31*e* included in the regulator 31.

In the regulator 31, the control pressure introduced to the pressure receiver 31*e* is increased by the torque reduction amount Td, and the maximum absorption torque set by the biasing forces of the springs 31*a* and 31*b* and the control pressure introduced to the pressure receiver 31*e* is reduced based on the increase in the control pressure. In FIG. 8, the output torque Te3 corresponds to the target torque Tr2 (=Tr0*rated*−Td).

Figure 9:
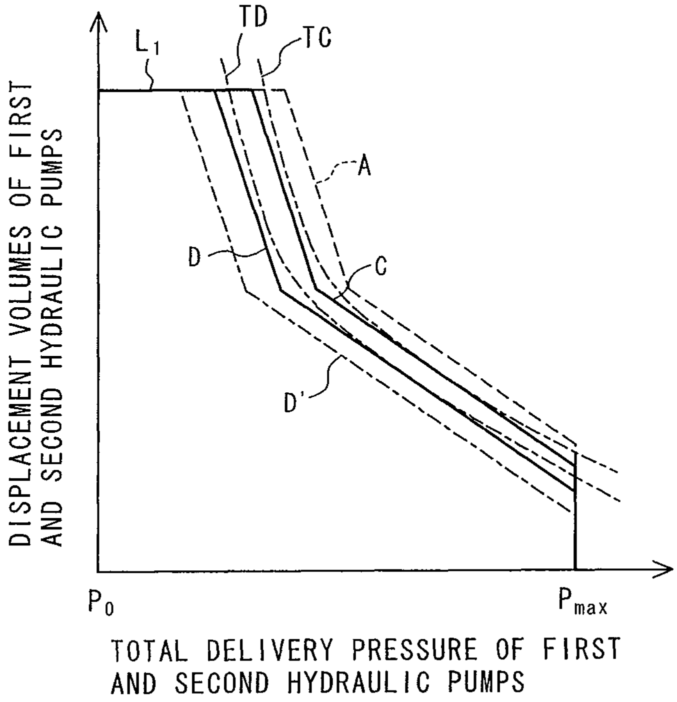
FIG. 9 is a graph showing torque control characteristics of the regulator under the condition that the temperature of the hydraulic fluid is lower than 25° C.

The change in the maximum absorption torque set in the regulator 31 in the abovementioned case will be described with reference to FIG. 9. FIG. 9 is a graph showing torque control characteristics of the regulator 31 when the temperature of the hydraulic fluid is lower than 25° C. In FIG. 9, a symbol TC indicates a constant torque curved line obtained when the target torque Tr2 is lower by the torque reduction amount Td than the base torque Tr0*rated*. A broken line C shown in FIG. 9 indicates a characteristic line obtained by the absorption torque control performed by the regulator 31 when the target torque Tr2 is lower by the torque reduction amount Td than the base torque Tr0*rated*. The characteristic line A (shown in FIG. 3) obtained when the temperature of the hydraulic fluid is in the range of the normal temperature is shown by a dotted line for comparison.

When the temperature of the hydraulic fluid is lower than 25° C., the target torque Tr2 is reduced to the value lower by the torque reduction amount Td than the base torque Tr0*rated* as described above. The characteristic line for the absorption torque control is shifted from the broken line A to the broken line C based on the reduction in the target torque Tr2. Since the torque output from the engine 1 in this case is equal to the value Te1 corresponding to the operation point P1, and the output torque Te1 is smaller than the value Te3, the first and second hydraulic pumps 2 and 3 are operated with the displacement volumes and the total delivery pressure which correspond to a range surrounded by the characteristic line C and the maximum volume characteristic line L1 and present on the constant torque curved line corresponding to the output torque Te1.

When the load applied to the engine 1 is increased due to a heavy load operation from the abovementioned state, and the operation point of the engine 1 moves from the point P1 in FIG. 8 to, for example, the point P2 present on the characteristic line F of the full load region, the engine speed Ne of the engine 1 is reduced from the rated engine speed Nrated to the value Ne2. In this case, the engine speed deviation calculating section 42 performs a calculation to obtain the engine speed deviation ΔN, which is a negative value. The SS control torque calculating section 43 calculates the first order modification torque ΔTs1 (for the speed sensing control) corresponding to the engine speed deviation ΔN. In addition, the first modification factor calculating section 44 performs a calculation to obtain the first modification factor Kn equal to 1 since the target engine speed Nr is equal to the rated engine speed Nrated. The second modification factor calculating section 45 performs a calculation to obtain the second modification factor Kt corresponding to the temperature Tf of the hydraulic fluid, which is lower than 1 since the temperature Tf of the hydraulic fluid is lower than 25° C. The minimum value selecting section 48 selects the modification factor Kc, which is equal to the modification factor Kt (<1).

The control gain modifying section 49 performs a calculation to obtain the second order modification torque ΔTs2 lower than the first order modification torque ΔTs1 for the speed sensing control since the modification factor Kc is equal to the modification factor Kt (<1). The low pass filter section 50 calculates the modification torque ΔTs3 (for the speed sensing control) corresponding to the second order modification torque ΔTs2 (<ΔTs1). Accordingly, the modification torque ΔTs3 is modified based on the temperature of the hydraulic fluid by means of the modification factor Kt (<1), and the low pass filter section 50 obtains a smaller value of the modification torque ΔTs3 than that in the case where the modification torque $\Delta Ts3$ is not modified based on the temperature of the hydraulic fluid.

The hydraulic fluid temperature torque reduction section 53 performs a calculation to obtain the torque reduction amount Td larger than 0 based on the temperature Tf of the hydraulic fluid since the temperature Tf of the hydraulic fluid is lower than 25° C. The target torque calculating section 55 calculates the Tr2 as follows.

$$Tr1=Tr0\text{rated}+\Delta Ts3$$

$$Tr2=Tr1-Td=Tr0\text{rated}+\Delta Ts3-Td$$

That is, the target torque Tr2 is reduced to a value lower by the torque reduction amount Td and the modification torque $\Delta Ts3$ than the base torque Tr0*rated*. The target torque Tr2 is processed by the solenoid valve output pressure calculating section 56 and the solenoid valve drive current calculating section 57. The solenoid proportional valve 35 is driven to output the corresponding control pressure to the pressure receiver 31*e* included in the regulator 31.

The output pressure Pc calculated by the solenoid valve output pressure calculating section 56 is in inverse proportion to the target torque Tr2. In the regulator 31, therefore, the control pressure introduced to the pressure receiver 31*e* is increased by the torque reduction amount Td and the modification torque $\Delta Ts3$, and the maximum absorption torque set by the biasing forces of the springs 31*a* and 31*b* and the control pressure introduced to the pressure receiver 31*e* is reduced based on the increase in the control pressure.

The change in the maximum absorption torque set in the regulator 31 in the abovementioned case corresponds to the change of the characteristic line obtained by the absorption torque control from the broken line C to a broken line D in FIG. 9. In FIG. 9, a constant torque curved line TD is obtained when the target torque Tr2 is reduced to a level lower by the torque reduction amount Td and the modification torque $\Delta Ts3$ than the base torque Tr0*rated*. The broken line D is a characteristic line obtained by the absorption torque control performed by the regulator 31 when the target torque Tr2 is reduced to the value lower by the torque reduction amount Td and the modification torque $\Delta Ts3$ than the base torque Tr0*rated*. Since the target torque Tr2 is reduced to the value lower by the torque reduction amount Td and the modification torque $\Delta Ts3$ than the base torque Tr0*rated*, the characteristic line obtained by the absorption torque control is shifted from the broken line C to the broken line D. The first and second hydraulic pumps 2 and 3 are operated with the displacement volumes and the total delivery pressure, which correspond to the broken line D.

Since the characteristic line of the absorption torque control is shifted from the broken line C to the broken line D, and the maximum absorption torque set in the regulator 31 is reduced as described above, the load applied to the engine 1 is reduced. The engine 1 can quickly increase the engine speed due to the control on the amount of the fuel to be injected by the fuel injection unit 25.

In the present embodiment, the modification torque $\Delta Ts3$ is modified based on the temperature of the hydraulic fluid. Thus, the modification torque $\Delta Ts3$ is a smaller value than that in the case where the modification torque $\Delta Ts3$ is not modified based on the temperature of the hydraulic fluid. In FIG. 9, a broken line D' indicated by an alternate long and short dash line is a characteristic line obtained by the absorption torque control performed under the condition that the solenoid proportional valve 35 generates control pressure by use of the modification torque $\Delta Ts3$ which is not modified based on the temperature of the hydraulic fluid and the maximum absorption torque is set by means of the generated control pressure. As apparent from the comparison between the broken lines D and D', the modified amount (fluctuation) of the torque to be used for the speed sensing control under the condition that the modification torque $\Delta Ts3$ is modified based on the temperature of the hydraulic fluid is smaller by the modified amount of the modification torque $\Delta Ts3$ than that of the torque under the condition that the modification torque $\Delta Ts3$ is not modified based on the temperature of the hydraulic fluid. The maximum absorption torque set in the regulator 31 becomes larger by the difference between the modified amounts of the torques than that in the case where the modification torque $\Delta Ts3$ is not modified based on the temperature of the hydraulic fluid. This makes it possible to suppress a response delay in the speed sensing control due to the delay of the output of the control pressure from the solenoid proportional valve 35 under the condition that the temperature of the hydraulic fluid is low and the viscosity of the hydraulic fluid is high, the delay of the pump tilting operation by means of the regulator 31, or the like and prevent the resonance between a fluctuating frequency of the pump torque due to the speed sensing control and a fluctuating frequency of the engine speed of the engine 1 due to the control on the amount of the fuel to be injected.

The modification based on the temperature of the hydraulic fluid of the modification torque $\Delta Ts3$ means that the amount of the controlled pump torque under the speed sensing control is reduced under the condition that the temperature of the hydraulic fluid is low in order to reduce the effectiveness of the speed sensing control. Under the condition that the effectiveness of the speed sensing control is reduced, if the target torque Tr2 is equal to the base torque Tr0, the engine 1 may be stalled due to the delay of an operation of the regulator 31 when a load is rapidly applied, or the number of temporal reductions in the engine speed of the engine 1 may be increased. In the present embodiment, a target value of the maximum absorption torque is set to a relatively low level based on the temperature of the hydraulic fluid, and the maximum absorption torque of the hydraulic pumps is controlled to be a relatively low level. This can prevent the stall of the engine 1 and the increase in the number of temporal reductions in the engine speed of the engine 1 due to the reduction in the effectiveness of the speed sensing control.

Figure 10:
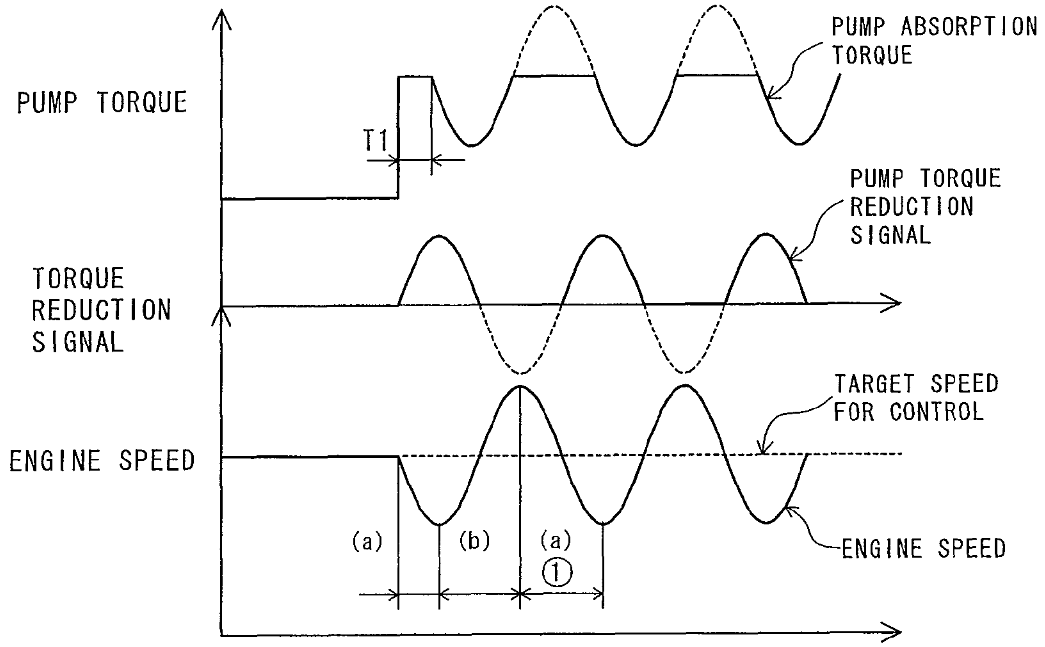
FIG. 10 is a timing chart showing the relationship among fluctuations of a torque reduction signal obtained under the condition that the temperature of a hydraulic fluid is low and the viscosity of the hydraulic fluid is high, fluctuations of the actual total absorption torque of first and second hydraulic pumps, and fluctuations of the engine speed of an engine, in a pump torque control system having conventional speed sensing control means.
Figure 11:
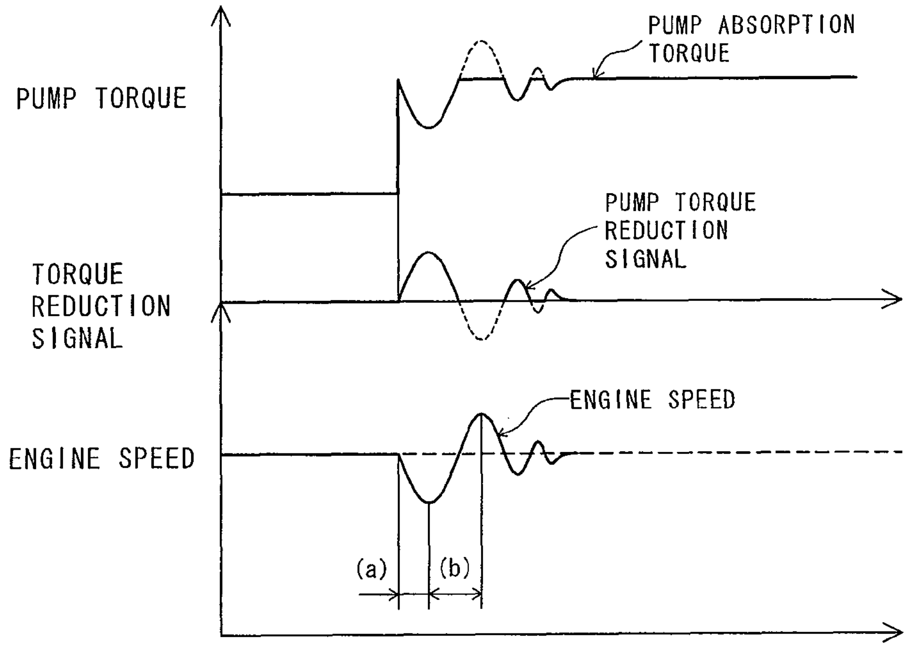
FIG. 11 is a timing chart showing the relationship among fluctuations of a torque reduction signal obtained under the condition that the temperature of the hydraulic fluid is low and the viscosity of the hydraulic fluid is high, fluctuations of the actual total absorption torque of first and second hydraulic pumps, and fluctuations of the engine speed of the engine, in the pump torque control system according to the first embodiment.

FIGS. 10 and 11 are timing charts showing effects of a conventional technique and the present embodiment, respectively. FIG. 10 shows the effect in the case where, for example, a pump torque control system having a conventional speed sensing control means as described in Patent Document 1 (JP-B-62-8618). FIG. 11 shows the effect obtained in the present embodiment. Each of FIGS. 10 and 11 schematically shows the relationship of a fluctuation of a torque reduction signal when the temperature of the hydraulic fluid is low and the viscosity of the hydraulic fluid is high, a fluctuation of the actual absorption torque of the first and second hydraulic pumps 2 and 3, and a fluctuation of the engine speed.

In the conventional technique as shown in FIG. 10, since the modification torque $\Delta Ts3$ is not modified based on the temperature of a hydraulic fluid, there is a response delay, which is a time difference T1 between a generation of the modification torque $\Delta Ts3$ which is a torque reduction signal and a reduction in an actual pump absorption torque. As a result, a region (a) and a region (b) alternately appear to cause a resonance. In the region (a), the pump torque is large, and the engine speed is reduced. In the region (b), the pump torque is small, and the engine speed is increased and excessively large.

On the other hand, since the modification torque ΔTs3 is modified based on the temperature of the hydraulic fluid as shown in FIG. 11 in the present embodiment, there is a small response delay between the generation of the modification torque ΔTs3 which is the torque reduction signal and the reduction in the actual pump absorption torque. The amplitude of each of the torque reduction signal, the actual pump absorption torque, and the engine speed is also small. The fluctuation range of each of the torque reduction signal, the actual pump absorption torque, and the engine speed is quickly reduced.

The abovementioned operations are performed under the condition that the target engine speed of the engine 1, which is instructed by the engine speed instruction unit 21, is equal to the rated engine speed Nrated. When the target engine speed of the engine 1, which is instructed by the engine speed instruction unit 21, is lower than the rated engine speed Nrated, the base torque calculating section 41 and the first modification factor calculating section 44 perform calculations to respectively obtain the base torque Tr0 and the first modification factor Kn (i.e., the modification torque ΔTs3 of the speed sensing control), which are lower than those in the case where the target engine speed is equal to the rated engine speed Nrated. The speed sensing control is performed based on the target engine speed. In this case, when the reduction in the temperature of the hydraulic fluid is small and the first modification factor Kn is larger than the second modification factor Kt even under the condition that the temperature of the hydraulic fluid is low, the speed sensing control is performed giving priority to the reduction in the target engine speed. In this case, the modification torque ΔTs3 for the speed sensing control is reduced based on the reduction in the target engine speed. This makes it possible to suppress the response delay in the speed sensing control due to the delay of the output of the control pressure from the solenoid proportional valve 35 when the temperature of the hydraulic fluid is low and the viscosity of the hydraulic fluid is high, the delay of the pump tilting operation performed by the regulator 31 or the like and prevent the resonance between the fluctuating frequency of the pump torque due to the speed sensing control and the fluctuating frequency of the engine speed of the engine 1 due to the control on the amount of the fuel to be injected. When the reduction in the target engine speed is small, or when the reduction in the temperature of the hydraulic fluid is large and the first modification factor Kn is smaller than the second modification factor Kt, the modification torque ΔTs3 is modified based on the temperature of the hydraulic fluid, and the resonance between a fluctuating frequency of the pump torque due to the speed sensing control and a fluctuating frequency of the engine speed due to the control on the amount of the fuel to be injected to the engine 1 can be prevented in the same manner as the case where the target engine speed is equal to the rated engine speed Nrated.

If the hydraulic fluid temperature sensor 34 fails and does not normally functions, the hydraulic fluid temperature sensor abnormality determination section 46 detects the abnormality, and the first switch section 47 outputs a value of "1" as the second modification factor Kt, and the third switch section 54 outputs a value of "0" as the torque reduction amount Td. In this way, the modification based on the temperature of the hydraulic fluid in the speed sensing control is cancelled, and the pump torque control can be performed giving priority to safety. Similarly, if the engine sensor 33 fails and does not normally functions, the engine sensor abnormality determination section 51 detects the abnormality, and the second switch section 52 outputs a value of "0" as the modification torque ΔTs3. In this way, the speed sensing control itself is cancelled, and the pump torque control can be performed giving priority to safety.

In the present embodiment described above, the regulation region R (shown in FIG. 8) controlled by the fuel injection unit 25 has isochronous characteristics. The regulation region R may have known droop characteristics in which the engine speed Ne of the engine is increased as the torque output from the engine is reduced. In this case, the present invention is applicable and can obtain the same effect.

Figure 12:
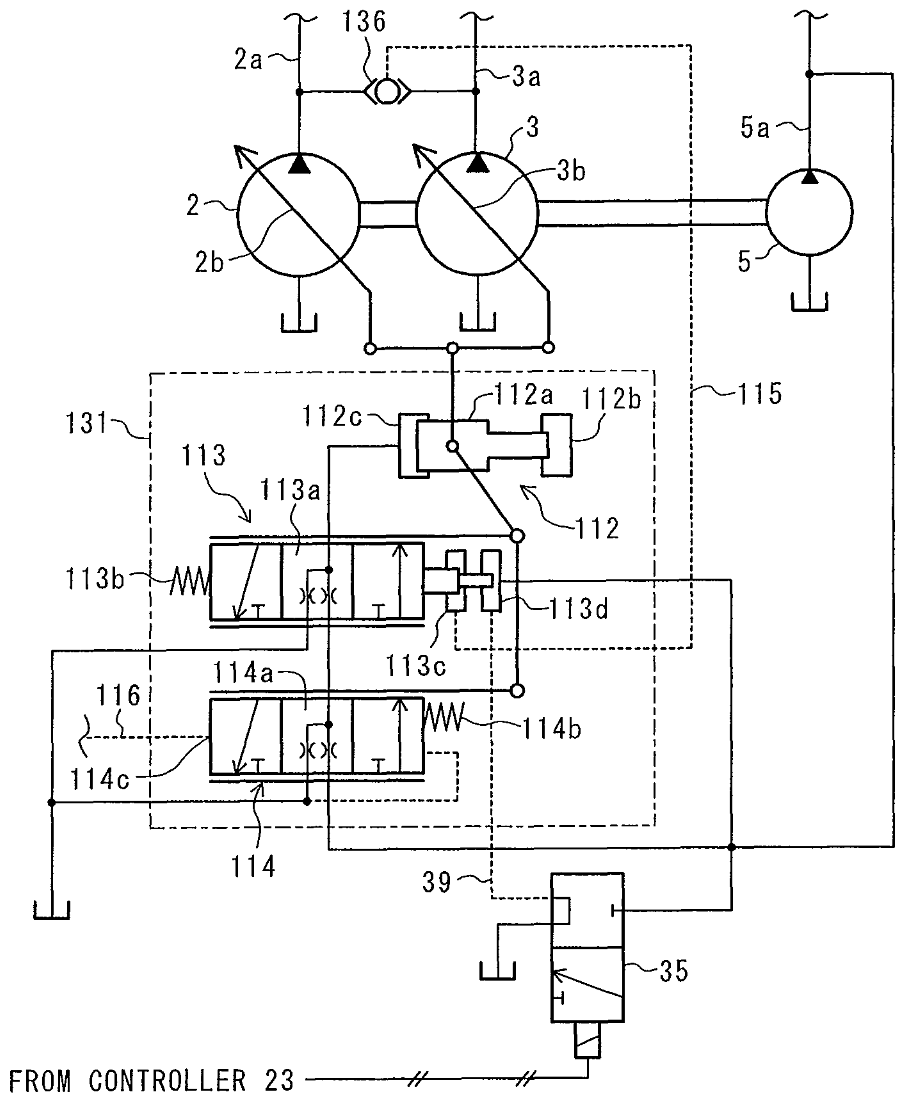
FIG. 12 is a diagram showing a regulator included in a pump torque control system according to a second embodiment of the present invention.

A description will be made of a second embodiment of the present invention with reference to FIG. 12. FIG. 12 is a diagram showing a regulator included in a pump torque control system according to the second embodiment. In FIG. 12, the same reference numerals as those shown in FIG. 1 denote the same members as those shown in FIG. 1. In the second embodiment, the regulator has a function for controlling the volume (delivery flow rate) of the first and second hydraulic pumps based on a demanded flow rate.

In FIG. 12, the first and second hydraulic pumps 2 and 3 are provided with the regulator 131. The first and second hydraulic pumps 2 and 3 control the displacement volumes by adjusting tilting angles of swash plates 2*b* and 3*b* which are variable displacement volume members by means of the regulator 131. The first and second hydraulic pumps 2 and 3 control the amount of the hydraulic fluid to be delivered based on the demanded flow rate and control the pump absorption torque.

The regulator 131 has a tilting control actuator 112 for operating the swash plates 2*b* and 3*b*; a torque control servo valve 113 for controlling the tilting control actuator 112; and a position control valve 114. The tilting control actuator 112 is connected to the swash plates 2*b* and 3*b*. The tilting control actuator 112 has a pump tilting control spool 112*a*, a tilting control increasing torque pressure receiver chamber 112*b*, and a tilting control reducing torque pressure receiver chamber 112*c*. The pump tilting control spool 112*a* has pressure receiving sections at both edges thereof. The pressure receiving sections of the pump tilting control spool 112*a* have respective pressure receiving areas different from each other. The tilting control increasing torque pressure receiver chamber 112*b* is located on the side of the smaller one of the pressure receiving areas of the pump tilting control spool 112*a*. The tilting control reducing torque pressure receiver chamber 112*c* is located on the side of the larger one of the pressure receiving areas of the pump tilting control spool 112*a*. The tilting control increasing torque pressure receiver chamber 112*b* is connected to the delivery line 5*a* of the pilot pump 5 through a hydraulic line 135. The tilting control reducing torque pressure receiver chamber 112*c* is connected to the hydraulic line 135 through the torque control servo valve 113 and the position control valve 114.

The torque control servo valve 113 has a torque control spool 113*a*, a spring 113*b*, a PQ control pressure receiver chamber 113*c* and a torque reduction control pressure receiver chamber 113*d*. The spring 113*b* is located on the side of an edge of the torque control spool 113*a*. The PQ control pressure receiver chamber 113*c* is located on the side of the other edge of the torque control spool 113*a*. A shuttle valve 136 is connected to the delivery line 2*a* of the hydraulic pump 2 and to the delivery line 2*b* of the hydraulic pump 3 and adapted to detect delivery pressure applied from the high voltage side of the first and second hydraulic pumps 2 and 3. The PQ control pressure receiver chamber 113*c* is connected to an output port of the shuttle valve 136 through a signal line 115. The torque reduction control pressure receiver chamber 113*d* is connected to an output port of the solenoid proportional valve 35 through the control hydraulic line 39. The solenoid proportional valve 35 is operated by means of the drive signal (electrical signal) transmitted from the controller 23 (shown in FIG. 1) as described above.

The position control valve 114 has a position control spool 114*a*, a spring 114*b*, and a control pressure receiver chamber 114*c*. The spring 114*b* is located on the side of an edge of the position control spool 114*a* and used to maintain the position. The spring 114*b* has a low elastic force. The control pressure receiver chamber 114*c* is located on the side of the other edge of the position control spool 114*a*. The control pressure receiver chamber 114*c* receives a hydraulic signal 116 corresponding to an operation amount (demanded flow rate) of an operation system related to the first and second hydraulic pumps 2 and 3. The hydraulic signal 116 can be generated through any of known various methods. For example, the control pilot pressure output from the control lever units 77, 78, 79, 80, 81, and 82 is introduced to a plurality of the shuttle valves. The control pilot pressure having the highest voltage is selected from the control pilot pressure output from the control lever units 77, 78, 79, 80, 81, and 82 shown in FIG. 2. The control pilot pressure having the highest voltage is regarded as the hydraulic signal 116. When the flow rate control valves 67, 68, 69, 70, 71, and 72 are of center bypass type, a throttle is provided on the most downstream side of a center bypass line. Pressure on the upstream side of the throttle may be detected as negative control pressure, and the negative control pressure may be reversed to be treated as the hydraulic signal 116.

The pump tilting control spool 112*a* controls the tilting angles (volumes) of the swash plates of the first and second hydraulic pumps 2 and 3 by means of a pressure balance of the hydraulic fluids present in the pressure receiver chambers 112*b* and 112*c*. The delivery pressure on the high voltage side of the first and second hydraulic pumps 2 and 3 is introduced to the PQ control pressure receiver chamber 113*c* of the torque control servo valve 13. The higher the delivery pressure introduced to the PQ control pressure receiver chamber 113*c* is, the more the torque control spool 113*a* moves to the left side of the FIG. 12. Therefore, the hydraulic fluid delivered from the pilot pump 5 flows to the pressure receiver chamber 112*c*, and the pump tilting control spool 112*a* moves to the right side of FIG. 12. In addition, the swash plates 2*b* and 3*b* of the first and second hydraulic pumps 2 and 3 are driven to ensure that the displacement volumes of the first and second hydraulic pumps 2 and 3 is reduced. The pump absorption torque is reduced due to the reduction in the displacement volumes. As the delivery pressure from the first and second hydraulic pumps 2 and 3 is reduced, operations opposite to the abovementioned operations are performed. That is, the swash plates 2*b* and 3*b* of the first and second hydraulic pumps 2 and 3 are driven to ensure that the displacement volumes of the first and second hydraulic pumps 2 and 3 are increased, and the pump absorption torque is increased due to the increase in the displacement volumes.

The characteristics of the absorption torque control performed by the torque control servo valve 113 for the first and second hydraulic pumps 2 and 3 are determined by the spring 113*b* and the control pressure introduced to the torque reduction pressure receiver chamber 113*d*. The characteristics of the absorption torque control is shifted (refer to FIGS. 3 and 9) by controlling the solenoid proportional valve 35 to change the control pressure.

The configuration of parts other than the abovementioned parts in the second embodiment is essentially the same as that according to the first embodiment.

In the configuration according to the second embodiment described above, the regulator 131 has the function for controlling the volume (delivery flow rate) of the first and second hydraulic pumps 2 and 3 based on the demanded flow rate. The pump torque control system having the abovementioned configuration according to the second embodiment can obtain a similar effect to that in the first embodiment.

The invention claimed is:

1. A pump torque control system for a hydraulic construction machine, comprising:

a prime mover (1);

variable displacement hydraulic pumps (2, 3) that are rotationally driven by the prime mover; and hydraulic actuators (7, 8, 9, 10, 11, 12) that are driven by means of a hydraulic fluid delivered from the hydraulic pumps, wherein the pump torque control system comprises:

pump absorption torque control means (31; 131) for controlling displacement volumes of the hydraulic pumps (2, 3) to ensure that a total absorption torque of the hydraulic pumps (2, 3) does not exceed a set maximum absorption torque; and speed sensing control means (33, 34, 35, 23, 41 to 57) for calculating a first torque reduction amount (ΔTs3) based on a deviation between a target engine speed of the prime mover (1) and an actual engine speed of the prime mover (1) and for performing a control to reduce the maximum absorption torque of the hydraulic pumps (2, 3), with an increase of an absolute value of the first torque reduction amount being made when the actual engine speed of the prime mover is lowered from the target engine seed, the maximum absorption torque being set in the pump absorption torque control means (31; 131), and wherein the speed sensing control means (33, 34, 35, 23, 41 to 57) includes:

hydraulic fluid temperature detection means (34) for detecting the temperature of the hydraulic fluid; and first hydraulic fluid temperature modification means (45, 49) for modifying a control gain to be used to calculate the first torque reduction amount (ΔTs3) in order to ensure that the absolute value of the first torque reduction amount (ΔTs3) is reduced as the temperature of the hydraulic fluid detected by the hydraulic fluid temperature detection means (34) is reduced.

2. The pump torque control system according to claim 1, wherein the speed sensing control means (33, 34, 35, 23, 41 to 57) further includes:

second hydraulic fluid temperature modification means (53, 55) for limiting a target value of the maximum absorption torque to ensure that the maximum absorption torque set in the pump absorption torque control means (31; 131) is reduced as the temperature of the hydraulic fluid detected by the hydraulic fluid temperature detection means (34) is reduced.

3. The pump torque control system according to claim 1, wherein the first hydraulic fluid temperature modification means (45, 49) includes:

first means (45) for calculating a hydraulic fluid temperature modification value (Kt) that is reduced as the temperature of the hydraulic fluid is reduced; and second means (49) for modifying the first torque reduction amount (ΔTs3) by using the hydraulic fluid temperature modification value (Kt) and changing the control gain, the speed sensing control means (33, 34, 35, 23, 41 to 57) further includes:

third means (55) for reducing the absolute value of the first torque reduction amount (ΔTs3) modified by the second means (49) from a base torque (Tr0) of the hydraulic pumps (2, 3) to calculate a target value (Tr1) of the maximum absorption torque; and fourth means (35, 56, 57) for setting the maximum absorption torque of the hydraulic pumps (2, 3) in the absorption torque control means (31; 131) based on the target value (Tr1) of the maximum absorption torque.

4. The pump torque control system according to claim 3, wherein the speed sensing control means (33, 34, 35, 23, 41 to 57) further includes:

fifth means (53) for calculating a second torque reduction amount (Td) that is reduced as the temperature of the hydraulic fluid detected by the hydraulic fluid temperature detection means (34) is reduced, and the third means (55) reduces the first and second torque reduction amount (ΔTs3, Td) from the base torque (Tr0) of the hydraulic pumps to calculate a target value (Tr2) of the maximum absorption torque.

* * * * *